(No Model.)　　　　W. R. CHISHOLM.　　　2 Sheets—Sheet 1.
CANE HARVESTER.

No. 506,904.　　　　　　　　Patented Oct. 17, 1893.

WITNESSES:
Henry J. Miller
Chas. H. Luther Jr.

INVENTOR:
William R. Chisholm,
by Joseph A. Miller & Co.
Attys (No Model.)  2 Sheets—Sheet 2.

W. R. CHISHOLM.
CANE HARVESTER.

No. 506,904. Patented Oct. 17, 1893.

WITNESSES:
Henry J. Miller
Chas. H. Luther Jr.

INVENTOR:
William R. Chisholm
by Joseph A. Miller & Co.
Attys.

UNITED STATES PATENT OFFICE.

WILLIAM R. CHISHOLM, OF BARRINGTON, RHODE ISLAND.

CANE-HARVESTER.

SPECIFICATION forming part of Letters Patent No. 506,904, dated October 17, 1893.

Application filed March 20, 1893. Serial No. 466,866. (No model.)

*To all whom it may concern:*

Be it known that I, WILLIAM R. CHISHOLM, of Barrington, in the county of Bristol and State of Rhode Island, have invented certain new and useful Improvements in Cane-Harvesters; and I hereby declare that the following is a full, clear, and exact description of the same, reference being had to the accompanying drawings, forming part of this specification.

This invention has reference to improvements in machines for harvesting and stripping cane, particularly sugar-cane.

One object of the invention is to produce a machine of this nature by means of which the cane will be cut close to the roots without injury thereto.

Another object of the invention is to construct a cane-harvester which can be drawn along the ridges, in which the cane is planted, without materially bearing on the crests thereof and crushing the roots after the cane has been cut.

The invention consists in the peculiar construction of the various parts of the machine and their novel combination.

The invention also consists in such other novel features of construction and combination of parts as will hereinafter be more fully described and pointed out in the claims.

Figure 1:
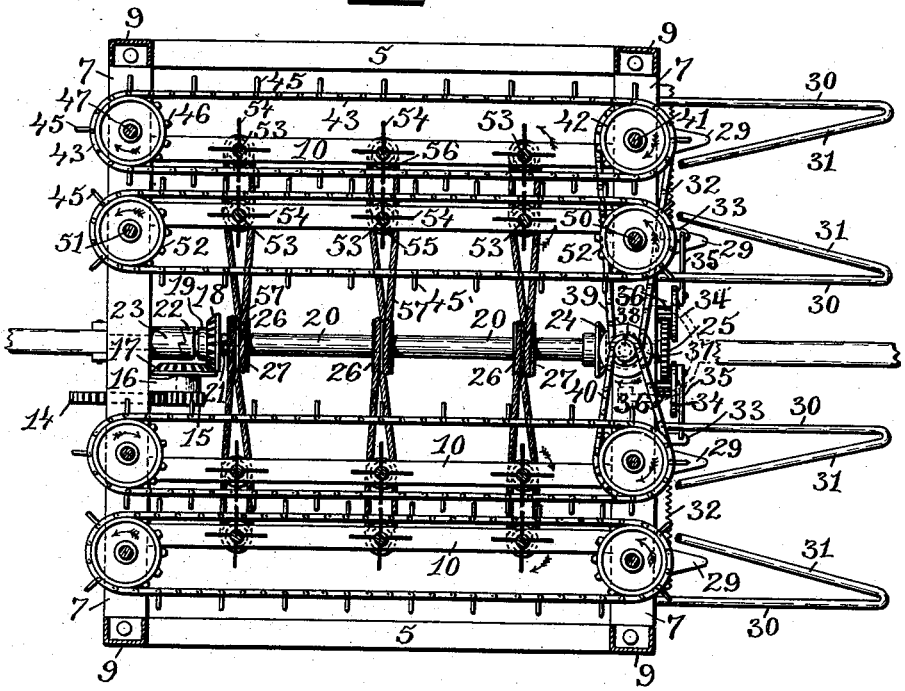
Figure 2:
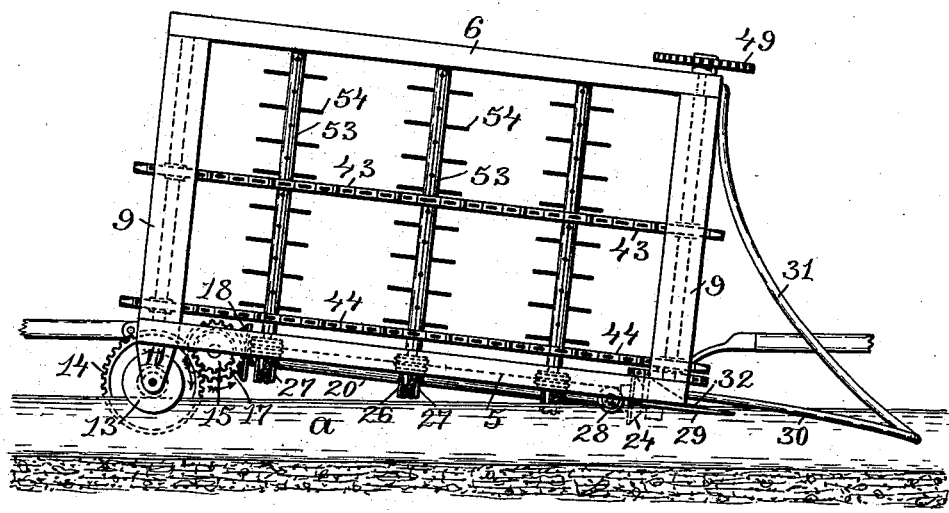
Figure 3:
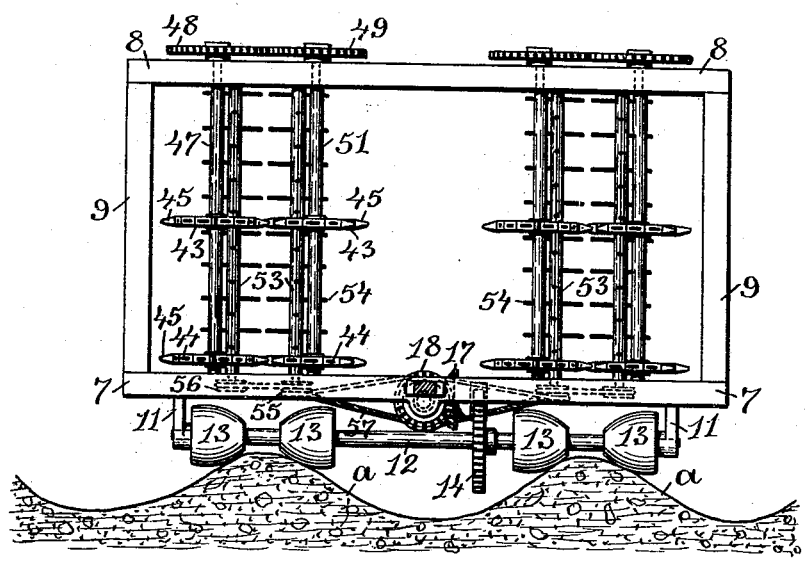
Figure 4:
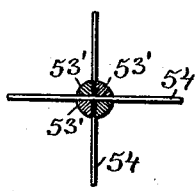

Figure 1 represents a sectional view of the improved harvester showing a plan of the mechanism. Fig. 2 represents a side elevation. Fig. 3 is a rear elevation of the same, showing the harvester in position on two cane ridges. Fig. 4 is an enlarged detail view of one of the strippers, the shaft being shown in section.

Similar numbers of reference designate corresponding parts throughout.

This harvesting and stripping device is designed to operate on two rows of cane at the same time and to be moved along over the two ridges without injury to the roots of the cane which are left for the second and sometimes the third sprouting. It is necessary to cut the sugar-cane very close to the roots without tearing the same out, and while the passage of the harvester lengthwise over the ridges is indispensable, the wheels or other supports for the harvester-carriage must not pass over the roots and crush them, nor can these wheels travel in the gullies between the ridges owing to the looseness of the soil and the continual presence of water therein.

The harvester-frame practically consists of an upper and a lower frame which are wide enough to extend over two of the cane ridges as is shown in Fig. 3 of the drawings. These frames have side-rails 5—5 and 6—6, and cross-bars 7—7 and 8—8, the cross-bars of both frames being connected by the longitudinal-braces 10—10, correspondingly located in both frames, and the upper frame is supported on the corner posts 9—9. Depending from the cross-bar 7 forming the rear of the lower frame are the brackets 11—11 in which the ends of the shaft, or axle, 12 are journaled, and on this shaft are mounted four truncated conical-wheels 13—13 which are adapted to press on the sides of the ridges $a, a$. Also mounted on this shaft is the gear 14 which intermeshes with the gear 15 secured to one end of a short shaft journaled in a bearing in the bracket 16 extending inwardly from the rear cross-bar 7, and on the opposite end of this shaft is fixed a bevel-gear 17 which intermeshes with the bevel-gear 18 mounted on the sleeve 19. This sleeve is connected with the drive-shaft 20 by a key 21 which prevents the independent rotation of the sleeve 19 but allows the same to be reciprocated on the shaft to bring the gear 18 into or out of engagement with the gear 17 and its clutch 22 into the same relation with the clutch-sleeve 23 secured to the shaft. The shaft 20 is journaled in bearings in the cross-bars 7—7 and at its forward portion is provided with the bevel-gear 24 within the frame and the gear 25 in front of the frame. Also secured to the shaft are the belt-pulleys 26 and 27.

The forward end of the frame is depressed to bring it close to the ground and is supported on the small wheels 28—28 bearing on the sides of the cane ridges, and extending from the forward frame are the shoes 29—29 and the lower arms of the guides 30—30 their forward ends being separated sufficiently to allow the spreading branches of the cane to be embraced between them and to be directed inward and upward by the gradually-curving arms 31—31 secured at their ends to the upper forward cross-bar 8. Immediately above the shoes 29 are guides in which the saws 32—

32 are free to reciprocate. The inner ends of the saws have arms 33—33 extending at right angles with the line of the teeth, and pivotally connecting these arms with the crank-disks 34—34 are the connecting-rods 35—35, the crank-disks being mounted on the ends of short-shafts journaled in the forward cross-bar 7 and having pinion-gears 36—36 which intermesh with and are driven by the large gear 25 on the driving-shaft.

Intermeshing with the bevel-gear 24 is the bevel-gear 37 journaled on a shaft which extends upward from the front cross-bar 7 and secured to this gear are the smaller chain-gears 38 by means of which the chains 39 and 40 are driven in opposite directions. The chain 39 extends around a sprocket-wheel which is mounted on the vertical-shaft 41 journaled in bearings in the upper and lower forward cross-bars 7 and 8 near the left side of the machine; also mounted on this shaft are sprocket-wheels, as 42, for driving the chains 43 and 44 having projections 45—45. At the rear of the machines these chains are supported on sprocket-wheels 46 secured to the shaft 47 journaled in the rear cross-bars of the machine frame. On the upper end of the shaft 41, or that marked 47, is secured a gear 48 which intermeshes with a gear 49 on the upper end of the shaft 50 or 51 which are similarly mounted carrying sprocket-wheels 52 and feed-chains movable in an opposite direction to those first mentioned, so that the arms, or projections, 45—45 of the chains will, at their nearest approach, travel in the same general direction and feed the stalks of the cane through the machine.

Journaled in the upper and lower braces 10—10 are the stripper-shafts 53 furnished with renewable stripper-arms 54—54 of stiff spring-metal. On the lower ends of the stripper-shafts are pulleys 55 and 56 which are driven by the belts 57—57 passing over the pulleys 27 of the main drive-shafts and short belts 58 connecting the pulleys, so that the stripper-arms of each pair of shafts approach each other from opposite directions and more thoroughly act on the stalks fed therethrough to strip the leaves therefrom. The mechanism thus described on one side of the central drive-shaft is duplicated on the other side, with the exception that the chain-belt 40 extends around a suitable pulley on the nearest feed-shaft to drive this feeding-device in the proper direction.

The stripper shafts are formed of separable segmental sections 53'—53' between which are clamped, in alternating directions, the arms 54 made generally of stiff wire and renewable from time to time as they become worn or bent. The sections 53' of the stripper-shafts may be secured together by clamps or by bolts as may be desired.

The frame is furnished with poles to which horses or mules may be attached to either push or pull the machine along, or other driving means may be used. When the machine approaches clumps of cane the branches are engaged by the forwardly extending guides which first lift the outwardly-extending branches and then direct them to the saws which, being rapidly reciprocated, cut the branches off. As the machine now moves along the branches are taken up by the feed-chains 43 and 44, the chains 43 being situated so as to support the branches in the upright position and, by their operation, the cane branches are carried between the stripper-arms, the rapid revolutions of these arms will tend to tear the leaves from the stalks or branches and the stalks thus being carried through the machine the refuse will drop through the open bottom of the machine.

Having thus described my invention, I claim as new and desire to secure by Letters Patent—

1. A cane-harvester and stripper furnished with duplicate stripping-mechanism and supported on conical-wheels, arranged in pairs and adapted to bear on the sides of the cane ridges as described.

2. In a cane-harvester, the combination with saws, the rear axle, conical-wheels arranged in pairs upon said axle, and mechanism intermediate the axle and the saws for driving the same from the axle, of guides for directing the cane toward the saws, and stripping-mechanism for removing the leaves from the cane after it has been cut.

3. In a cane-harvester, the combination with a rectangular frame work, conical-wheels arranged in pairs and adapted to bear on the sides of the cane hills, for supporting the rear end, smaller wheels for supporting the front end in a depressed position, of cutting-devices carried on the front end of the frame, and guides, formed of the lower arms 30 and the upwardly and inwardly curving arms 31, extending from the forward portion of the mechanism, as described.

4. The combination in a harvester with a frame work supported on wheels, a gear keyed to the rear axle, a longitudinal shaft mounted in bearings in the frame, gears connecting the shaft with the gear of the rear axle, saws mounted in guides at the forward end of the frame, and mechanism for operating the saws, of feeding-devices located on each side of the drive-shaft, a series of strippers consisting of rotatable-shafts journaled in bearings and carrying spring-arms, and mechanism for operating the feeding and stripping-devices, as described.

5. The combination with a frame consisting of the side-bars 5—5 and 6—6 and the cross-bars 7—7 and 8—8 forming upper and lower frames united by the corner posts 9—9, the axle 12, having the wheels 13—13 and the gear 14 keyed thereto, journaled in brackets pendent from the rear cross-bar 7, the shaft 20 carrying gears 19, 24 and 25, and pulleys 26 and 27, gears for transmitting motion from the gear 14 to that marked 19, a bevel-gear rotatable on a vertical-shaft intermeshing with the bevel-gear 24 and having chain-pulleys, saws mounted in guides at the forward end of the frame, means operated by the gear 25 for reciprocating the same, and guides for directing the cane to the saws, of the feed-chains supported and operated as herein described, and rotatable-strippers between which the cane may be carried by the feed-chains, as and for the purpose described.

WILLIAM R. CHISHOLM.

Witnesses:
HENRY J. MILLER,
M. F. BLIGH.